(12) United States Patent
Foster et al.

(10) Patent No.: US 12,709,211 B2
(45) Date of Patent: Aug. 18, 2026

(54) GROUNDING SYSTEM

(71) Applicant: Caterpillar Inc., Peoria, IL (US)

(72) Inventors: Evan Lee Foster, Metamora, IL (US); Joel Scott Johnson, Washington, IL (US); William Christopher Boley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 206 days.

(21) Appl. No.: 18/636,720

(22) Filed: Apr. 16, 2024

(65) Prior Publication Data

US 2025/0319808 A1 Oct. 16, 2025

(51) Int. Cl.

*B60P 3/00* (2006.01)
*B60P 3/22* (2006.01)
*H05F 3/02* (2006.01)
*E21B 7/02* (2006.01)

(52) U.S. Cl.

CPC ................ *B60P 3/224* (2013.01); *H05F 3/02* (2013.01); *E21B 7/02* (2013.01)

(58) Field of Classification Search

CPC ............... B60P 3/224; H05F 3/02; E21B 7/02
See application file for complete search history.

(56) References Cited

U.S. PATENT DOCUMENTS

| | | | | |
|---|---|---|---|---|
| 1,600,549 | A * | 9/1926 | Jurs | B67D 7/32 141/382 |
| 3,038,972 | A | 6/1962 | Lagier | |
| 4,921,217 | A | 5/1990 | Kies et al. | |
| 10,427,630 | B1 | 10/2019 | Clark | |
| 11,311,996 | B2 * | 4/2022 | Gardikis | H01R 4/66 |
| 12,015,255 | B2 * | 6/2024 | Behrendt | H02G 13/40 |
| 2017/0271788 | A1 | 9/2017 | Addington et al. | |
| 2018/0354409 | A1 * | 12/2018 | Maiorana | B60P 3/2245 |
| 2019/0234146 | A1 | 8/2019 | Weightman | |

FOREIGN PATENT DOCUMENTS

| | | | | |
|---|---|---|---|---|
| CN | 210052855 | U * | 2/2020 | |
| CN | 221282890 | U * | 7/2024 | |
| DE | 102012104546 | A1 * | 11/2013 | F17C 6/00 |
| DE | 102018123714 | | 12/2019 | |

* cited by examiner

*Primary Examiner* — Pete T Lee

(57) ABSTRACT

A fuel trailer includes a frame, a fuel tank coupled to the frame that is configured to provide fuel, at a fueling location, to a system that is not associated with the fuel trailer, and a grounding system coupled to the frame. The grounding system includes a hydraulic actuator coupled to the frame. The hydraulic actuator includes a cylinder and a grounding rod that is movable relative to the cylinder. The grounding rod is movable from a stowed position to a deployed position. In the deployed position, the grounding rod extends outside a spatial envelope of the fuel trailer including below a bottom surface of a tire, of the fuel trailer, and is configured to be received within a ground surface at the fueling location. The grounding system includes a rod actuation assembly adapted to move the grounding rod between the stowed position and the deployed position.

20 Claims, 3 Drawing Sheets

GROUNDING SYSTEM

TECHNICAL FIELD

The present disclosure relates to a fuel trailer including a grounding system, a fuel supply vehicle including a grounding system, and an energy supply module including a grounding system.

BACKGROUND

Vehicles, such as fuel trailers, fuel trucks, power modules, charging systems, and the like may be used to replenish fuel supply or electrical power supply to work machines operating at worksites. Electrical grounding is required for all of these vehicles, in order to prevent any inadvertent circumstances due to discharge of electricity via such vehicles. Conventional grounding techniques involve a manual process of pounding a ground rod into a ground surface by a personnel. Such a manual process may be tiresome for the personnel and may also be time consuming. In some examples, the personnel may forget to deploy the ground rod into the ground surface before using the vehicle, which may not be desirable. In other examples, a driver of the vehicle may drive away the vehicle without removing the ground rod from the ground surface, which may damage the ground rod and/or the vehicle.

U.S. Pat. No. 10,427,630 describes a utility vehicle that includes a chassis and a centrally-mounted ground-rod driver system. The chassis presents a central area. The centrally-mounted ground-rod driver system is secured to the chassis at the central area. The centrally-mounted ground-rod driver system includes a ground-rod, a driver assembly configured to drive the ground-rod into an underlying surface under the chassis, and a grounding cable associated with the ground-rod so as to allow an electrical discharge through the grounding cable, through the ground-rod, and into the underlying surface. The ground-rod is driven in beneath the central area of the chassis such that a radius of electrified ground of the underlying surface is away from a utility worker.

SUMMARY OF THE DISCLOSURE

In an aspect of the present disclosure, a fuel trailer is provided. The fuel trailer includes a frame. The fuel trailer also includes a fuel tank coupled to the frame that is configured to provide fuel, at a fueling location, to a system that is not associated with the fuel trailer. The fuel trailer further includes a grounding system coupled to the frame. The grounding system includes a hydraulic actuator coupled to the frame. The hydraulic actuator includes a cylinder and a grounding rod that is movable relative to the cylinder. The grounding rod is movable from a stowed position to a deployed position. In the deployed position, the grounding rod extends outside a spatial envelope of the fuel trailer including below a bottom surface of a tire, of the fuel trailer, and is configured to be received within a ground surface at the fueling location. The grounding system also includes a rod actuation assembly adapted to move the grounding rod between the stowed position and the deployed position.

In another aspect of the present disclosure, a fuel supply vehicle is provided. The fuel supply vehicle includes a frame. The fuel supply vehicle also includes a power source coupled to the frame that provides operating power to the fuel supply vehicle. The fuel supply vehicle further includes a fuel tank coupled to the frame that is configured to provide fuel, at a fueling location, to a system that is not associated with the fuel supply vehicle. The fuel supply vehicle includes a grounding system coupled to the frame. The grounding system includes a hydraulic actuator coupled to the frame. The hydraulic actuator includes a cylinder and a grounding rod that is movable relative to the cylinder. The grounding rod is movable from a stowed position to a deployed position. In the deployed position, the grounding rod extends outside a spatial envelope of the fuel supply vehicle including below a bottom surface of a tire, of the fuel supply vehicle, and is configured to be received within a ground surface at the fueling location. The grounding system also includes a rod actuation assembly adapted to move the grounding rod between the stowed position and the deployed position.

In yet another aspect of the present disclosure, an energy supply module is provided. The energy supply module includes a frame. The energy supply module also includes a power source coupled to the frame that is configured to provide a power supply, at a desired location, to a system that is not associated with the energy supply module. The power source includes at least one of a power module or a charging system. The energy supply module further includes a grounding system coupled to the frame. The grounding system includes a hydraulic actuator coupled to the frame. The hydraulic actuator includes a cylinder and a grounding rod that is movable relative to the cylinder. The grounding rod is movable from a stowed position to a deployed position. In the deployed position, the grounding rod extends outside a spatial envelope of the energy supply module including below a bottom surface of a tire, of the energy supply module, and is configured to be received within a ground surface at the desired location. The grounding system also includes a rod actuation assembly adapted to move the grounding rod between the stowed position and the deployed position.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
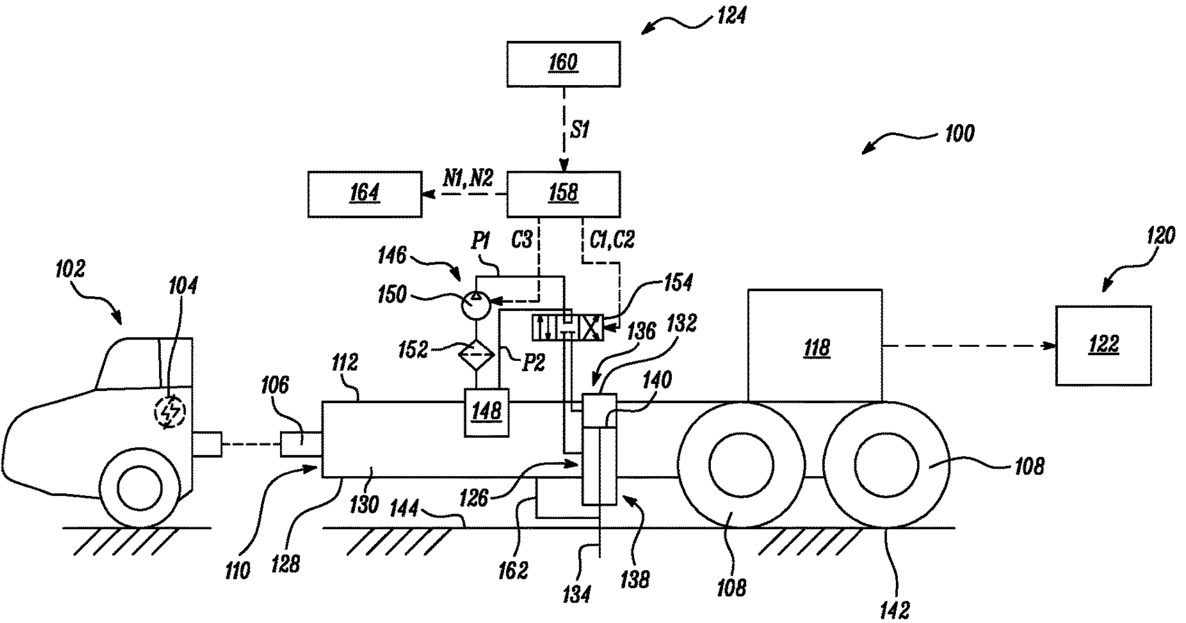
FIG. 1 illustrates a diagrammatic representation of a fuel trailer and a grounding system associated with the fuel trailer, according to an embodiment of the present disclosure.

FIG. 1 illustrates a diagrammatic representation of an exemplary fuel trailer 100. The fuel trailer 100 may be coupled with a vehicle 102 for transporting the fuel trailer 100 to a worksite. Specifically, the fuel trailer 100 is towed by the vehicle 102. The vehicle 102 includes a power source

104. The power source 104 generates power to drive the vehicle 102, and may embody an engine, a fuel cell, a battery module, and the like.

Further, the fuel trailer 100 includes a hitch assembly 106. The fuel trailer 100 is coupled to the vehicle 102 via the hitch assembly 106. The fuel trailer 100 also includes tires 108 to allow movement of the fuel trailer 100. Further, the fuel trailer 100 includes a frame 110. The frame 110 includes a platform 112 that allows positioning and support of one or more components on the fuel trailer 100 for transportation of such components. Further, the frame 110 may support various components of the fuel trailer 100, such as, the tires 108. In some examples, the fuel trailer 100 may include a battery system (not shown). For example, the battery system may provide power supply to one or more components of the fuel trailer 100. In another example, the fuel trailer 100 may include a generator (not shown) to provide power supply to one or more components of the fuel trailer 100.

The fuel trailer 100 also includes a fuel tank 118 coupled to the frame 110. The fuel tank 118 provides fuel, at a fueling location 120, to a system 122 (schematically shown herein) that is not associated with the fuel trailer 100. For example, the system 122 may include a construction machine, a mining machine, a stationary fuel tank, and the like. The fuel tank 118 is mounted on the platform 112.

The fuel trailer 100 further includes a grounding system 124 coupled to the frame 110. The grounding system 124 includes a hydraulic actuator 126 coupled to the frame 110. In an example, the hydraulic actuator 126 may be coupled to an underside 128 of the frame 110. In another example, the hydraulic actuator 126 may be coupled to a side surface 130 of the frame 110. In yet another example, a swing arm (not shown) may couple the hydraulic actuator 126 with the frame 110.

The hydraulic actuator 126 includes a cylinder 132 and a grounding rod 134 that is movable relative to the cylinder 132. The cylinder 132 defines a cylinder end 136 and a rod end 138 opposite to the cylinder end 136. The hydraulic actuator 126 further includes a piston 140 disposed within the cylinder 132. The piston 140 is coupled to the grounding rod 134 and is movable with the grounding rod 134.

The grounding rod 134 is movable from a stowed position to a deployed position. The grounding rod 134 is shown in the deployed position in FIG. 1. In the deployed position, the grounding rod 134 extends outside a spatial envelope of the fuel trailer 100 including below a bottom surface 142 of the tire 108, of the fuel trailer 100, and is received within a ground surface 144 at the fueling location 120. In an example, a tip of the grounding rod 134 that first contacts the ground surface 144 may have a shape or profile that allows easy installation of the grounding rod 134 within the ground surface 144. The grounding rod 134, the cylinder 132, and an actuation type is selected based on a terrain at the fueling location 120. The actuation type may include, for example, screw type actuation or percussion type actuation. It should be noted that a type of the cylinder 132 and the actuation type is based on a type of the grounding rod 134. Further, the grounding rod 134 is selected from the group including of the bar member, the drill bit, the hammer, and the screw-type rod, without any limitations. For example, if the ground surface 144 is easy to penetrate, the grounding rod 134 may include the bar member. However, if the ground surface 144 is rocky and difficult to penetrate, the grounding rod 134 may include the drill bit, the hammer, and the screw-type rod. The hammer may include, for example, a percussion hammer.

Further, a length of the grounding rod 134 may be decided such that the grounding rod 134 is received within the ground surface 144 up to a desired depth. As such the length of the grounding rod 134 may be at least greater than a distance between the rod end 138 of the cylinder 132 and the bottom surface 142 of the tires 108.

The grounding system 124 also includes a rod actuation assembly 146 that moves the grounding rod 134 between the stowed position and the deployed position. The rod actuation assembly 146 includes a fluid source 148 that holds fluid therein. The fluid may include any hydraulic fluid known in the art. The rod actuation assembly 146 also includes a fluid pump 150 in fluid communication with the fluid source 148. In the illustrated embodiment of FIG. 1, the fluid pump 150 is a hydraulic pump. Alternatively, the fluid pump 150 may be of any other type. The rod actuation assembly 146 further includes a filter 152 disposed between the fluid source 148 and the fluid pump 150. The fluid being directed towards the fluid pump 150 is filtered by the filter 152 to remove any contaminants that may be present in the fluid.

Further, the rod actuation assembly 146 includes a valve assembly 154 that provides selective fluid communication between the fluid pump 150 and the hydraulic actuator 126. In the illustrated embodiment of FIG. 1, the valve assembly 154 is embodied as a 4-way 3-position directional hydraulic valve assembly. Alternatively, the valve assembly 154 may be of any other type. The valve assembly 154 may be a solenoid operated valve assembly. Each of the valve assembly 154 and the fluid pump 150 may receive operating power from the power source 104 of the vehicle 102, the battery system of the fuel trailer 100, an external source of power supply available at the fueling location 120, or the generator of the fuel trailer 100, without any limitations.

The fluid pump 150 is operable to direct fluid from the fluid source 148 towards the valve assembly 154. Further, the valve assembly 154 directs the fluid to the cylinder end 136 or to the rod end 138 based on a configuration of the valve assembly 154. The fluid pump 150 is also operable to direct fluid from the valve assembly 154 back to the fluid source 148. The rod actuation assembly 146 includes a first fluid path P1 to direct fluid from the fluid source 148 to the valve assembly 154. The first fluid path P1 may include a number of fluid pipes, tubes, and the like. Further, the rod actuation assembly 146 also includes a second fluid path P2 to direct fluid from the valve assembly 154 to the fluid source 148. The second fluid path P2 may include a number of fluid pipes, tubes, and the like.

The valve assembly 154 is operable in a first configuration or a second configuration. The valve assembly 154 may also be disposed in a stand-by configuration. In the first configuration, the valve assembly 154 directs fluid from the fluid pump 150 towards the cylinder end 136 of the cylinder 132 to move the grounding rod 134 from the stowed position to the deployed position. In other words, when the valve assembly 154 is operated in the first configuration and the fluid pump 150 is operating in an ON-state, the valve assembly 154 directs the fluid towards the cylinder end 136 to extend the grounding rod 134. As the fluid flow is directed to the cylinder end 136, a volume of the cylinder 132 proximal to the cylinder end 136 expands, while simultaneously reducing a volume of the cylinder 132 proximal to the rod end 138 due to which the fluid flow is forced from the rod end 138 back to the fluid source 148 via the control valve 154. Continual application of pressure on the piston 140 causes the grounding rod 134 to extend, such that the grounding rod 134 can be at least partially received within the ground surface 144. In an example, the valve assembly 154 may be operated in the first configuration and the fluid pump 150 may be operated in the ON-state until the grounding rod 134 is in a fully deployed/extended position. The valve assembly 154 is illustrated in the a stand-by or resting position in FIG. 1.

Further, in the second configuration, the valve assembly 154 directs fluid flow from the fluid pump 150 towards the rod end 138 of the cylinder 132 to move the grounding rod 134 from the deployed position to the stowed position. In other words, when the valve assembly 154 is operated in the second configuration and the fluid pump 150 is operating in the ON-state, the valve assembly 154 directs the fluid towards the rod end 138 to retract the grounding rod 134. As the fluid flow is directed to the rod end 138, a volume of the cylinder 132 proximal to the rod end 138 expands, while simultaneously reducing the volume of the cylinder 132 proximal to the cylinder end 136 due to which the fluid flow is forced from the cylinder end 136 back to the fluid source 148 via the control valve 154. Continual application of pressure at the rod end 138 causes the grounding rod 134 to retract from the ground surface 144. In an example, the valve assembly 154 may be operated in the second configuration and the fluid pump 150 may be operated in the ON-state until the grounding rod 134 is in a fully retracted position.

The grounding system 124 further includes a controller 158 communicably coupled to each of the valve assembly 154 and the fluid pump 150. The controller 158 may include one or more memories and one or more processors. The processors may include any known in the art processing system.

The controller 158 controls an operation of each of the valve assembly 154 and the fluid pump 150 to move the grounding rod 134 between the stowed position and the deployed position. In an example, the controller 158 may generate and transmit a first control signal C1 to the valve assembly 154 to operate the valve assembly 154 in the first configuration. Further, the controller 158 may generate and transmit a second control signal C2 to the valve assembly 154 to operate the valve assembly 154 in the second configuration. Moreover, the controller 158 may generate and transmit a third control signal C3 to the fluid pump 150 to switch the fluid pump 150 between the ON-state and an OFF-state, as per requirements.

The controller 158 may generate the first, second, and third control signals C1, C2, C3 based on inputs received from a user, such as, an operator, a driver, or a ground personnel. For example, when the grounding rod 134 is to be moved to the deployed position, the controller 158 may receive the input from the user, based on which, the controller 158 may generate the first and third control signals C1, C3. Further, when the grounding rod 134 is to be moved to the stowed position, the controller 158 may receive the input from the user, based on which, the controller 158 may generate the second and third control signals C2, C3. The inputs may be sent to the controller 158 via a user interface 164. The user interface 164 may be present in the vehicle 102 or at a back office. The user interface 164 may include any know input/output device.

In some examples, the grounding system 124 includes one or more sensors 160. The sensors 160 may include position sensors. The sensors 160 may generate a signal S1 indicative of a position of the grounding rod 134. For example, the signal S1 received from the sensors 160 may be used to determine if the grounding rod 134 is in the deployed position or the stowed position.

In an example, the controller 158 may generate a notification N1 when the grounding rod 134 is in the deployed position. Specifically, the controller 158 may receive the signal S1 from the sensor 160. Further, the controller 158 may determine that the grounding rod 134 is in the deployed position based on the signal S1 received from the sensor 160. Furthermore, the controller 158 may transmit the notification N1 to the user interface 164 to notify users regarding the deployed position of the grounding rod 134. Based on the notification N1, users may begin a refueling operation using the fuel tank 118 of the fuel trailer 100.

In another example, the controller 158 may also generate a notification N2 when the grounding rod 134 is in the stowed position. Specifically, the controller 158 may receive the signal S1 from the sensor 160. Further, the controller 158 may determine that the grounding rod 134 is in the stowed position based on the signal S1 received from the sensor 160. Furthermore, the controller 158 may transmit the notification N2 to the user interface 164 to notify users regarding the stowed position of the grounding rod 134. Based on the notification N2, a driver of the vehicle 102 may drive the vehicle 102, thereby ensuring that the grounding rod 134 is in the stowed position before the vehicle 102 starts moving.

The grounding system 124 further includes a grounding cable 162 connected between the grounding rod 134 and the frame 110. The grounding cable 162 provides a path for an electrical discharge through the grounding cable 162, the grounding rod 134, and into the underlying ground surface 144. The grounding cable 162 may be formed of an electrically conductive material so as to allow electrical discharge. The grounding cable 162 may include an insulative sheath to prevent unintentional electrical discharge from the grounding cable 162. In an example, the grounding cable 162 may embody a braided cable.

Figure 2:
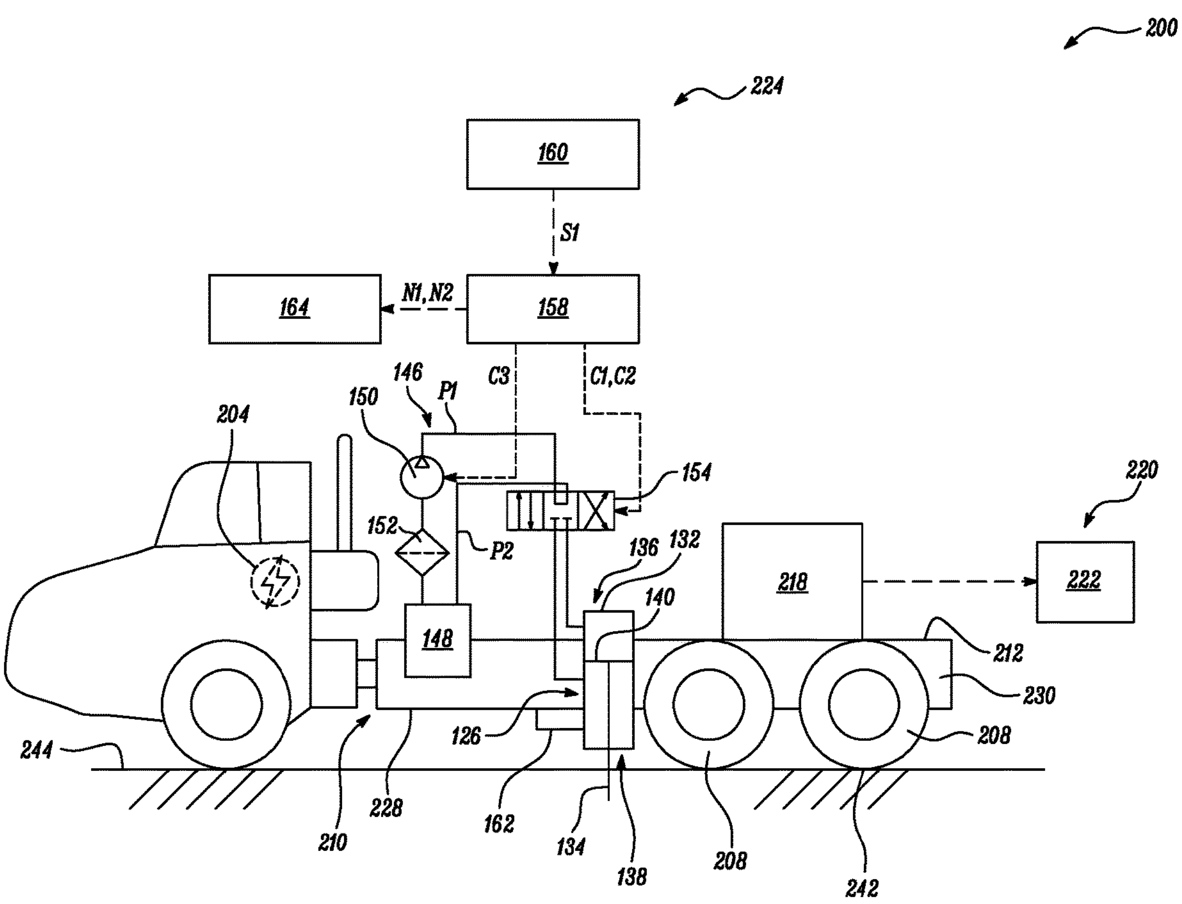
FIG. 2 illustrates a diagrammatic representation of a fuel supply vehicle and a grounding system associated with the fuel supply vehicle, according to another embodiment of the present disclosure.

FIG. 2 illustrates a diagrammatic representation of an exemplary fuel supply vehicle 200. The fuel supply vehicle 200 is embodied as a truck herein. Alternatively, the fuel supply vehicle 200 may include any other type of mobile vehicle. Further, the fuel supply vehicle 200 includes a frame 210. The frame 210 may support various components of the fuel supply vehicle 200. Further, the frame 210 includes a platform 212. In an example, the platform 212 may be replaced by a dump body, a payload carrier, or an enclosure.

The fuel supply vehicle 200 also includes a power source 204 coupled to the frame 210 that provides operating power to the fuel supply vehicle 200. The power source 104 generates power to drive the fuel supply vehicle 200. The power source 204 may embody an engine, a fuel cell, a battery module, and the like. The fuel supply vehicle 200 further includes tires 208 to allow movement of the fuel supply vehicle 200.

The fuel supply vehicle 200 also includes a fuel tank 218 coupled to the frame 210 that provides fuel, at a fueling location 220, to a system 222 (schematically shown herein) that is not associated with the fuel supply vehicle 200. For example, the system 222 may include a construction machine, a mining machine, a stationary fuel tank, and the like. The fuel tank 218 is mounted on the platform 212.

The fuel supply vehicle 200 further includes a grounding system 224 coupled to the frame 210. The grounding system 224 is substantially similar to the grounding system 124 described in relation to FIG. 1. Same components will be referred using the same reference numeral.

The grounding system 224 includes the hydraulic actuator 126 coupled to the frame 210. In an example, the hydraulic actuator 126 may be coupled to an underside 228 of the frame 210. In another example, the hydraulic actuator 126 may be coupled to a side surface 230 of the frame 210. In yet another example, a swing arm (not shown) may couple the hydraulic actuator 126 with the frame 210.

The hydraulic actuator 126 includes the cylinder 132 and the grounding rod 134 that is movable relative to the cylinder 132. The hydraulic actuator 126 further includes the piston 140 disposed within the cylinder 132. The grounding rod 134 is movable from the stowed position to the deployed position. The grounding rod 134 is shown in the deployed position in FIG. 2. In the deployed position, the grounding rod 134 extends outside a spatial envelope of the fuel supply vehicle 200 including below a bottom surface 242 of the tire 208, of the fuel supply vehicle 200, and is received within a ground surface 244 at the fueling location 220. The grounding rod 134, the cylinder 132, and an actuation type is selected based on a terrain at the fueling location 220. The actuation type may include, for example, screw type actuation or percussion type actuation. It should be noted that a type of the cylinder 132 and the actuation type is based on a type of the grounding rod 134. Further, the grounding rod 134 is selected from the group including of the bar member, the drill bit, the hammer, and the screw-type rod, without any limitations.

The grounding system 224 also includes the rod actuation assembly 146 that moves the grounding rod 134 between the stowed position and the deployed position. The rod actuation assembly 146 includes the fluid source 148 that holds fluid therein. The rod actuation assembly 146 also includes the fluid pump 150 in fluid communication with the fluid source 148. The rod actuation assembly 146 further includes the filter 152 disposed between the fluid source 148 and the fluid pump 150. Further, the rod actuation assembly 146 includes the valve assembly 154 that provides selective fluid communication between the fluid pump 150 and the hydraulic actuator 126. Each of the valve assembly 154 and the fluid pump 150 may receive operating power from the power source 204 of the fuel supply vehicle 200 or an external source of power supply available at the fueling location 220, without any limitations.

The fluid pump 150 is operable to direct fluid from the fluid source 148 towards the cylinder 132. The fluid pump 150 is also operable to direct fluid from the cylinder 132 back to the fluid source 148. The valve assembly 154 is operable in the first configuration or the second configuration. In the first configuration, the valve assembly 154 provides fluid communication between the fluid pump 150 and the cylinder end 136 of the cylinder 132 to move the grounding rod 134 from the stowed position to the deployed position. Further, in the second configuration, the valve assembly 154 provides fluid communication between the fluid pump 150 and the rod end 138 of the cylinder 132 to move the grounding rod 134 from the deployed position to the stowed position.

In some examples, the functionalities of the rod actuation assembly 146 may be performed by a hydraulic system that may be already present onboard the fuel supply vehicle 200. The hydraulic system may be used to actuate and/or operate various hydraulic components of the fuel supply vehicle 200.

The grounding system 224 further includes the controller 158 communicably coupled to each of the valve assembly 154 and the fluid pump 150. The controller 158 may control the operation of each of the valve assembly 154 and the fluid pump 150 to move the grounding rod 134 between the stowed position and the deployed position. In some examples, the grounding system 224 includes the one or more sensors 160. The sensors 160 may generate the signal S1 indicative of the position of the grounding rod 134. For example, the signal S1 received from the sensors 160 may be used to determine if the grounding rod 134 is in the deployed position or the stowed position.

In an example, the controller 158 may generate the notification N1 when the grounding rod 134 is in the deployed position. Specifically, controller 158 may determine that the grounding rod 134 is in the deployed position based on the signal S1 received from the sensor 160. Furthermore, the controller 158 may transmit the notification N1 to the user interface 164 to notify users regarding the deployed position of the grounding rod 134. Based on the notification N1, users may begin a refueling operation, using the fuel tank 218 of the fuel supply vehicle 200.

In another example, the controller 158 may also generate the notification N2 when the grounding rod 134 is in the stowed position. Specifically, the controller 158 may determine that the grounding rod 134 is in the stowed position based on the signal S1 received from the sensor 160. Furthermore, the controller 158 may transmit the notification N2 to the user interface 164 to notify users regarding the stowed position of the grounding rod 134. Based on the notification N2, a driver of the fuel supply vehicle 200 may drive the fuel supply vehicle 200, thereby ensuring that the grounding rod 134 is in the stowed position before the fuel supply vehicle 200 starts moving.

The grounding system 224 further includes the grounding cable 162 connected between the grounding rod 134 and the frame 210. The grounding cable 162 provides a path for an electrical discharge through the grounding cable 162, through the grounding rod 134, and into the underlying ground surface 244.

Figure 3:
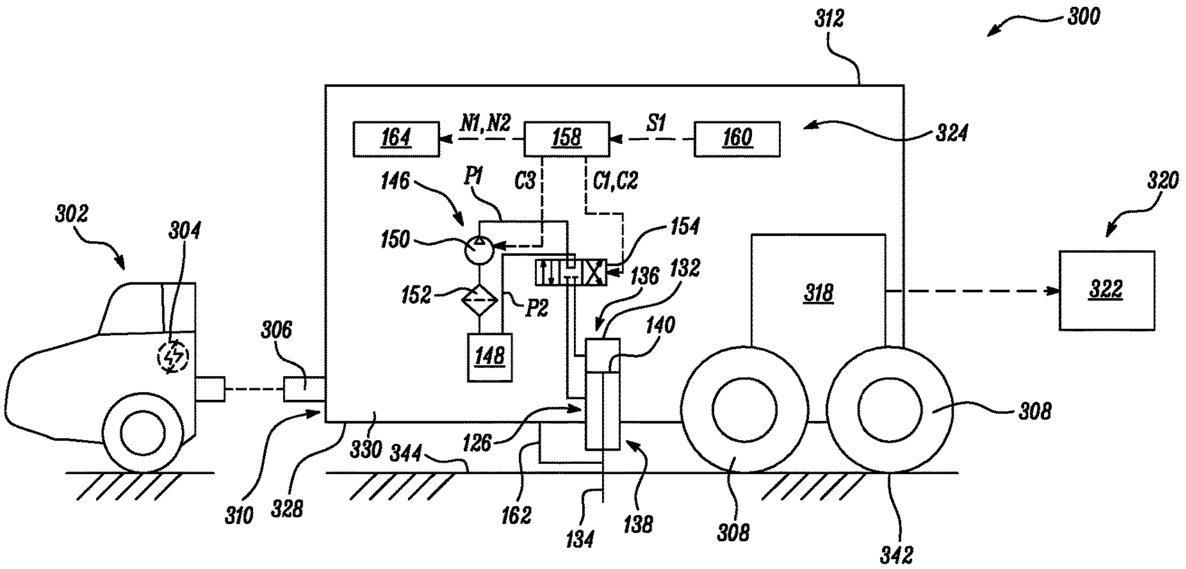
FIG. 3 illustrates a diagrammatic representation of an energy supply module and a grounding system associated with the energy supply module, according to yet another embodiment of the present disclosure.

FIG. 3 illustrates a diagrammatic representation of an exemplary energy supply module 300. The energy supply module 300 may be used to provide power supply at a worksite. The energy supply module 300 may be coupled with a vehicle 302 for transporting the energy supply module 300 to a worksite. Specifically, the energy supply module 300 is towed by the vehicle 302. The vehicle 302 includes a vehicle power source 304. The vehicle power source 304 generates power to drive the vehicle 302, and may embody an engine, a fuel cell, a battery module, and the like.

Further, the energy supply module 300 includes a frame 310. The frame 310 may support various components of the energy supply module 300. Further, the frame 310 includes an enclosure 312. The energy supply module 300 also includes a power source 318 coupled to the frame 310 that provides a power supply, at a desired location 320, to a system 322 (schematically shown herein) that is not associated with the energy supply module 300. For example, the system 322 may include a construction machine, a mining machine, a stationary energy storage module, and the like. The power source 318 includes an electric power module or a charging system. When embodied as the power module, the power source 318 may supply electric power to the system 322. When embodied as the charging system, the power source 318 may supply electric power to recharge one or more battery modules associated with the system 322.

Further, the enclosure 312 of the frame 310 receives and supports the power source 318 for transportation thereof. The energy supply module 300 also includes a hitch assembly 306. The energy supply module 300 is coupled to the vehicle 302 via the hitch assembly 306. The energy supply module 300 also includes tires 308 to allow movement of the energy supply module 300.

The energy supply module 300 further includes a grounding system 324 coupled to the frame 310. The grounding system 324 is substantially similar to the grounding system 124 described in relation to FIG. 1. Same components will be referred using the same reference numeral.

The grounding system 324 includes the hydraulic actuator 126 coupled to the frame 310. In an example, the hydraulic actuator 126 may be coupled to an underside 328 of the frame 310. In another example, the hydraulic actuator 126 may be coupled to a side surface 330 of the enclosure 312. In yet another example, a swing arm (not shown) may couple the hydraulic actuator 126 with the frame 310.

The hydraulic actuator 126 includes the cylinder 132 and the grounding rod 134 that is movable relative to the cylinder 132. The hydraulic actuator 126 further includes the piston 140 disposed within the cylinder 132. The grounding rod 134 is movable from the stowed position to the deployed position. The grounding rod 134 is shown in the deployed position in FIG. 3. In the deployed position, the grounding rod 134 extends outside a spatial envelope of the energy supply module 300 including below a bottom surface 342 of the tire 308, of the energy supply module 300, and is received within a ground surface 244 at the desired location 320. The grounding rod 134, the cylinder 132, and an actuation type is selected based on a terrain at the desired location 320. The actuation type may include, for example, screw type actuation or percussion type actuation. It should be noted that a type of the cylinder 132 and the actuation type is based on a type of the grounding rod 134. Further, the grounding rod 134 is selected from the group including of the bar member, the drill bit, the hammer, and the screw-type rod, without any limitations.

The grounding system 324 also includes the rod actuation assembly 146 that moves the grounding rod 134 between the stowed position and the deployed position. The rod actuation assembly 146 includes the fluid source 148 that holds fluid therein. The rod actuation assembly 146 also includes the fluid pump 150 in fluid communication with the fluid source 148. The rod actuation assembly 146 further includes the filter 152 disposed between the fluid source 148 and the fluid pump 150. Further, the rod actuation assembly 146 includes the valve assembly 154 that provides selective fluid communication between the fluid pump 150 and the hydraulic actuator 126. Each of the valve assembly 154 and the fluid pump 150 may receive operating power from the vehicle power source 304 of the vehicle 302 or an external source of power supply available at the desired location 320, without any limitations.

The fluid pump 150 is operable to direct fluid from the fluid source 148 towards the cylinder 132. The fluid pump 150 is also operable to direct fluid from the cylinder 132 back to the fluid source 148. The valve assembly 154 is operable in the first configuration or the second configuration. In the first configuration, the valve assembly 154 provides fluid communication between the fluid pump 150 and the cylinder end 136 of the cylinder 132 to move the grounding rod 134 from the stowed position to the deployed position. Further, in the second configuration, the valve assembly 154 provides fluid communication between the fluid pump 150 and the rod end 138 of the cylinder 132 to move the grounding rod 134 from the deployed position to the stowed position.

The grounding system 324 further includes the controller 158 communicably coupled to each of the valve assembly 154 and the fluid pump 150. The controller 158 may control the operation of each of the valve assembly 154 and the fluid pump 150 to move the grounding rod 134 between the stowed position and the deployed position. In some examples, the grounding system 324 includes the one or more sensors 160. The sensors 160 may generate the signal S1 indicative of the position of the grounding rod 134. For example, the signal S1 received from the sensors 160 may be used to determine if the grounding rod 134 is in the deployed position or the stowed position.

In an example, the controller 158 may generate the notification N1 when the grounding rod 134 is in the deployed position. Specifically, controller 158 may determine that the grounding rod 134 is in the deployed position based on the signal S1 received from the sensor 160. Furthermore, the controller 158 may transmit the notification N1 to the user interface 164 to notify users regarding the deployed position of the grounding rod 134. Based on the notification N1, users may use the power source 318 for providing power supply or to commence a recharging operation.

In another example, the controller 158 may also generate the notification N2 when the grounding rod 134 is in the stowed position. Specifically, the controller 158 may determine that the grounding rod 134 is in the stowed position based on the signal S1 received from the sensor 160. Furthermore, the controller 158 may transmit the notification N2 to the user interface 164 to notify users regarding the stowed position of the grounding rod 134. Based on the notification N2, a driver of the vehicle 302 may drive the vehicle 302, thereby ensuring that the grounding rod 134 is in the stowed position before the vehicle 302 starts moving.

The grounding system 324 further includes the grounding cable 162 connected between the grounding rod 134 and the frame 310. The grounding cable 162 provides a path for an electrical discharge through the grounding cable 162, through the grounding rod 134, and into the underlying ground surface 244.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the grounding system 124, 224, 324. The grounding system 124, 224, 324 automates the otherwise manual process of deploying/installing the grounding rod 134 into the ground surface 144, 244, 344. The grounding system 124, 224, 324 may allow quicker installation and removal of the grounding rod 134. Further, the grounding system 124, 224, 324 may reduce operator fatigue and improve workplace ergonomics by providing an automated grounding solution.

Furthermore, the grounding system 124, 224, 324 generates the notification N1 which ensures that the grounding rod 134 is deployed before commencing any operation using the fuel trailer 100, the fuel supply vehicle 200, and the energy supply module 300. Moreover, the grounding system 124, 224, 324 generates the notification N2 which ensures that the grounding rod 134 is in the stowed position before drivers start driving the vehicle 102, 302 or the fuel supply vehicle 200, thereby preventing any damage to the grounding rod 134, the vehicle 102, 302, the fuel trailer 100, the fuel supply vehicle 200, or the energy supply module 300.

Further, a type of the grounding rod 134, the cylinder 132, and the actuation type may be selected based on the terrain at which the fuel trailer 100, the fuel supply vehicle 200, or the energy supply module 300 is to be grounded. It should be noted that the type of the cylinder 132 and the actuation type is based on the type of the grounding rod 134. Selection of an appropriate type of the grounding rod 134, the cylinder 132, and the actuation type may further reduce installation and removal time of the grounding rod 134 from the ground surface 144, and may also prevent/reduce damage to the grounding rod 134. Moreover, the hydraulic actuator 126 and the grounding rod 134 may be replaceable in case of failure thereof. The grounding system 124, 224, 324 described herein may be cost-effective, easy to implement, and may be implemented on existing fuel trailers, fuel supply vehicles, and/or energy supply modules.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A fuel trailer comprising:

a frame;

a fuel tank coupled to the frame that is configured to provide fuel, at a fueling location, to a system that is not associated with the fuel trailer; and a grounding system coupled to the frame, the grounding system including:

a hydraulic actuator coupled to the frame, the hydraulic actuator including a cylinder and a grounding rod that is movable relative to the cylinder, wherein the grounding rod is movable from a stowed position to a deployed position, and wherein in the deployed position, the grounding rod extends outside a spatial envelope of the fuel trailer including below a bottom surface of a tire, of the fuel trailer, and is configured to be received within a ground surface at the fueling location; and a rod actuation assembly adapted to move the grounding rod between the stowed position and the deployed position; and a controller configured to generate a first notification under a condition where the grounding rod is in the deployed position.

2. The fuel trailer of claim 1, wherein the rod actuation assembly includes:

a fluid source adapted to hold fluid therein;

a fluid pump in fluid communication with the fluid source; and a valve assembly adapted to provide selective fluid communication between the fluid pump and the hydraulic actuator, wherein the fluid pump is operable to direct fluid from the fluid source towards the valve assembly, wherein the valve assembly is operable in at least one of a first configuration and a second configuration, and wherein:

in the first configuration, the valve assembly directs fluid from the fluid pump towards a cylinder end of the cylinder to move the grounding rod from the stowed position to the deployed position; and in the second configuration, the valve assembly directs fluid from the fluid pump towards a rod end of the cylinder to move the grounding rod from the deployed position to the stowed position.

3. The fuel trailer of claim 2, wherein the controller is communicably coupled to each of the valve assembly and the fluid pump, and wherein the controller is configured to control an operation of each of the valve assembly and the fluid pump to move the grounding rod between the stowed position and the deployed position.

4. The fuel trailer of claim 2, wherein the fuel trailer is adapted to be towed by a vehicle, the vehicle includes a power source, and wherein each of the valve assembly and the fluid pump is adapted to receive operating power from at least one of the power source of the vehicle, a battery system of the fuel trailer, an external source of power supply available at the fueling location, or a generator of the fuel trailer.

5. The fuel trailer of claim 1, wherein the grounding system further includes a grounding cable connected between the grounding rod and the frame.

6. The fuel trailer of claim 1, wherein the grounding rod, the cylinder, and an actuation type are selected based on terrain at the fueling location, and wherein the grounding rod are selected from the group consisting of: a bar member, a drill bit, a hammer, and a screw-type rod.

7. A fuel supply vehicle comprising:

a frame;

a power source coupled to the frame that provides operating power to the fuel supply vehicle;

a fuel tank coupled to the frame that is configured to provide fuel, at a fueling location, to a system that is not associated with the fuel supply vehicle; and a grounding system coupled to the frame, the grounding system including:

a hydraulic actuator coupled to the frame, the hydraulic actuator including a cylinder and a grounding rod that is movable relative to the cylinder, wherein the grounding rod is movable from a stowed position to a deployed position, and wherein in the deployed position, the grounding rod extends outside a spatial envelope of the fuel supply vehicle including below a bottom surface of a tire, of the fuel supply vehicle, and is configured to be received within a ground surface at the fueling location; and a rod actuation assembly adapted to move the grounding rod between the stowed position and the deployed position; and a controller configured to generate a first notification under a condition where the grounding rod is in the stowed position.

8. The fuel supply vehicle of claim 7, wherein the rod actuation assembly includes:

a fluid source adapted to hold fluid therein;

a fluid pump in fluid communication with the fluid source; and a valve assembly adapted to provide selective fluid communication between the fluid pump and the hydraulic actuator, wherein the fluid pump is operable to direct fluid from the fluid source towards the valve assembly, wherein the valve assembly is operable in at least one of a first configuration and a second configuration, and wherein:

in the first configuration, the valve assembly directs fluid from the fluid pump towards a cylinder end of the cylinder to move the grounding rod from the stowed position to the deployed position; and in the second configuration, the valve assembly directs fluid from the fluid pump towards a rod end of the cylinder to move the grounding rod from the deployed position to the stowed position.

9. The fuel supply vehicle of claim 8, wherein the controller is communicably coupled to each of the valve assembly and the fluid pump, and wherein the controller is configured to control an operation of each of the valve assembly and the fluid pump to move the grounding rod between the stowed position and the deployed position.

10. The fuel supply vehicle of claim 9, wherein the controller is configured to generate a second notification under a condition where the grounding rod is in the deployed position.

11. The fuel supply vehicle of claim 8, wherein each of the valve assembly and the fluid pump is adapted to receive operating power from at least one of the power source of the fuel supply vehicle or an external source of power supply available at the fueling location.

12. The fuel supply vehicle of claim 7, wherein the grounding system further includes a grounding cable connected between the grounding rod and the frame.

13. The fuel supply vehicle of claim 7, wherein the grounding rod, the cylinder, and an actuation type are selected based on a terrain at the fueling location, and wherein the grounding rod is selected, based on the terrain at the fueling location, from the group consisting of: a bar member, a drill bit, a hammer, and a screw-type rod.

14. An energy supply module comprising:

a frame;

a power source coupled to the frame that is configured to provide a power supply, at a desired location, to a system that is not associated with the energy supply module, wherein the power source includes at least one of a power module or a charging system; and a grounding system coupled to the frame, the grounding system including:

a hydraulic actuator coupled to the frame, the hydraulic actuator including a cylinder and a grounding rod that is movable relative to the cylinder, wherein the grounding rod is movable from a stowed position to a deployed position, and wherein in the deployed position, the grounding rod extends outside a spatial envelope of the energy supply module including below a bottom surface of a tire, of the energy supply module, and is configured to be received within a ground surface at the desired location; and a rod actuation assembly adapted to move the grounding rod between the stowed position and the deployed position, the rod actuation assembly includes:

a fluid source adapted to hold fluid therein;

a fluid pump in fluid communication with the fluid source; and a valve assembly adapted to provide selective fluid communication between the fluid pump and the hydraulic actuator, wherein the fluid pump is operable to direct fluid from the fluid source towards the valve assembly, wherein the valve assembly is operable in at least one of a first configuration and a second configuration, and wherein;

in the first configuration, the valve assembly directs fluid from the fluid pump towards a cylinder end of the cylinder to move the grounding rod from the stowed position to the deployed position; and in the second configuration, the valve assembly directs fluid from the fluid pump towards a rod end of the cylinder to move the grounding rod from the deployed position to the stowed position.

15. The energy supply module of claim 14, wherein the grounding system further includes a controller communicably coupled to each of the valve assembly and the fluid pump, and wherein the controller is configured to control an operation of each of the valve assembly and the fluid pump to move the grounding rod between the stowed position and the deployed position.

16. The energy supply module of claim 15, wherein the controller is configured to generate a notification responsive to the grounding rod reaching the deployed position.

17. The energy supply module of claim 14, wherein the grounding system further includes a grounding cable connected between the grounding rod and the frame.

18. The energy supply module of claim 14, wherein the grounding rod, the cylinder, and an actuation type are selected based on terrain at a fueling location, and wherein the grounding rod is selected from the group consisting of: a bar member, a drill bit, a hammer, and a screw-type rod.

19. The fuel trailer of claim 1, wherein the controller is configured to generate a second notification under a condition where the grounding rod reaches the stowed position.

20. The fuel supply vehicle of claim 7, wherein the controller is configured to generate a second notification responsive to the grounding rod reaching the deployed position.

* * * * *